Feb. 14, 1928.
1,658,924
A. HELLE ET AL
CHAIN MAKING MACHINE
Filed March 5, 1927   2 Sheets-Sheet 1
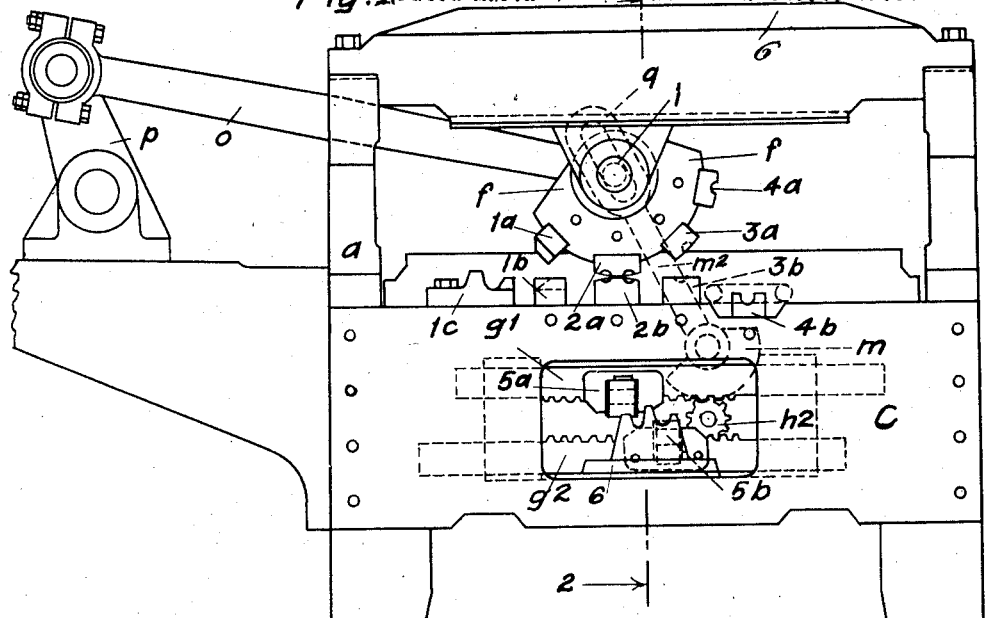
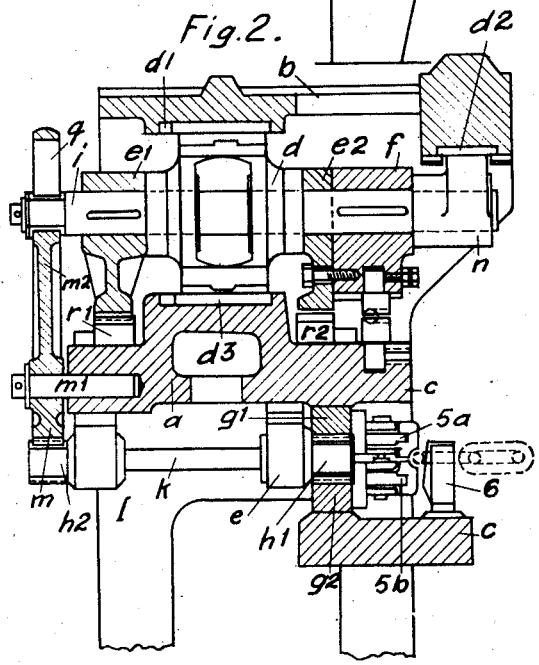
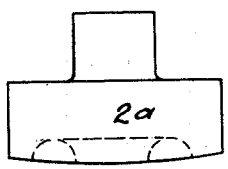
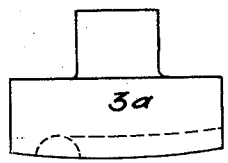
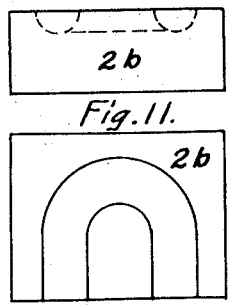
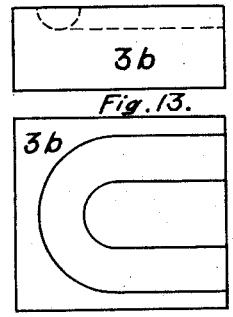
Anton Helle
Fritz Helle
INVENTORS
BY George B. Willcox
ATTORNEY

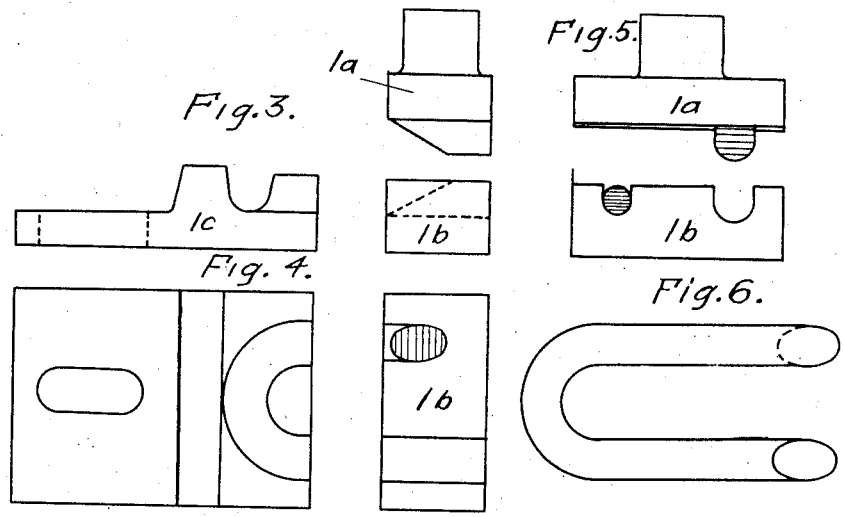
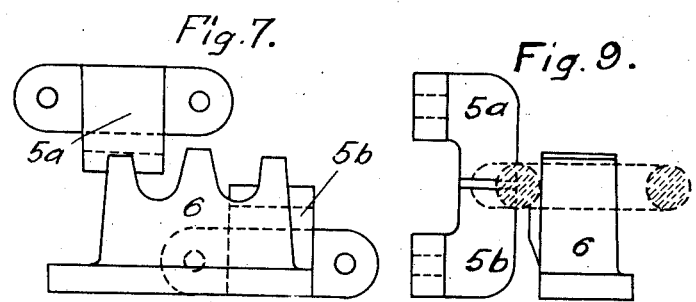
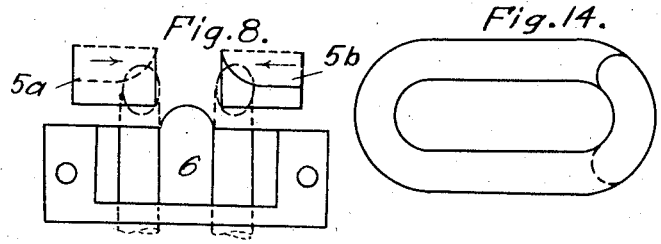

Patented Feb. 14, 1928.

1,658,924

UNITED STATES PATENT OFFICE.

ANTON HELLE AND FRITZ HELLE, OF RUETHEN, GERMANY.

CHAIN-MAKING MACHINE.

Application filed March 3, 1927, Serial No. 172,328, and in Germany February 22, 1926.

This invention pertains to a machine for making chain. The invention has for its object to combine the advantages of hand work in the formation of welded chain links with the advantages of mechanical production by power machinery, including a series of stationary anvils and rolling dies.

A further object is to arrange the rolling dies and their anvils in sequence, the dies being mounted on a cradle-like die-carrier. The dies engage their anvils in sequence so that by a forward and backward movement of the die-carrier the dies will successively be rotated into place opposite the anvils.

Another object of the invention is to provide a link-forming device also actuated by the aforesaid movement of the die-carrier, whereby at another place in the machine, previously formed U-shaped open links can be bent together at their ends to form closed chain links.

More specifically, the first operation of the die-carrier is to take the U-shaped blank and roll out its shank ends to approximately wedge shape, one of the beveled faces upward and the other downward. The next operation is to bend together the beveled ends to form closed chain links. This is done by reciprocating dies that are operatively connected to the die-carrier shaft. The closed links are then subjected to a forming operation between another die on the carrier and its stationary anvil to bring their beveled faces accurately together. The overlapping ends are welded, having been brought to a welding heat after the forming operation.

A further object of the invention is to provide means on the die-carrier for welding a transverse cross bar into the completed link if desired.

With the foregoing and certain other objects in view, which will appear later in the specifications, the invention comprises the devices described and claimed and the equivalents thereof.

In the drawings Fig. 1 is a side view of the machine.

Fig. 2 is a section on the line 2—2 of Fig. 1.

Fig. 3 is a side view of the holder for the U-shaped blank and the anvil and die for swaging its ends.

Fig. 4 is a top plan view of the holder and the anvil.

Fig. 5 is a front view of the die and anvil shown in Fig. 3.

Fig. 6 is a plan view of the blank as it appears after the end-beveling step.

Figs. 7, 8 and 9 are respectively side, top plan and end views of the device for bending together and overlapping the beveled ends of the blank to form a closed link.

Fig. 10 is a side view of the die and anvil for forming the link after beveling and end-closing.

Fig. 11 is a top view of the anvil shown in Fig. 10.

Fig. 12 is a side view of the die and anvil for welding the beveled ends.

Fig. 13 is a plan view of the anvil shown in Fig. 12.

Fig. 14 is a plan view of the finished chain link.

The machine structure will now be explained.

Upon the main frame $a$ is an upper frame member $b$ having guideways $d^1$, $d^2$.

A third and lower way $d^3$ is mounted directly on the machine frame $a$. A cross head $d$ slides upon these ways and carries an axle $i$, on which two toothed gear sectors $e'$, $e^2$ are fastened that mesh with two racks $r'$, $r^2$ on frame $a$.

Axle $i$ has oscillating or turning movement in a bearing $n$ which is slidable in guideway $d^2$, and cross head $d$ is connected to a crank $p$ by means of a connecting rod $o$ that is actuated from any suitable source of power.

Fixed to the axle $i$ is a die-carrying segment $f$ which carries on its periphery the dies $1^a$, $2^a$, $3^a$, $4^a$.

A horizontal rail $c$ of frame $a$ supports the anvil members $1^b$, $2^b$, $3^b$, $4^b$ that co-act with dies $1^a$, $2^a$, $3^a$, $4^a$ respectively.

A holder $1^c$ for holding chain blanks is arranged on the horizontal rail $c$ in front of the first anvil $1^b$, as shown in Fig. 1. The horizontal rail also carries the blank shaping or end-closing device above referred to. This end-closing means consists in two oppositely movable forming blanks $5^a$, $5^b$ having beveled work-engaging faces, as shown in Fig. 8. Adjacent the passing point of these two blanks is a blank holder 6 to support the link while its ends are being shaped, as indicated by dotted lines in Fig. 2.

The upper forming blank $5^a$ is carried by a rack $g'$ slidable on the end face of horizontal rail $c$. A corresponding second rack $g^2$ is also carried by the horizontal rail $c$. Motion in opposite directions is imparted to the two racks by the common gear $h^1$ fixed to a transverse shaft $k$ which is carried in suitable bearings $e$ secured to the main frame $a$.

At the back of the machine, shaft $k$ carries a gear $h^2$ which meshes with a gear sector $m$, capable of partial rotation about its pivot $m'$. The gear $h^2$ has an upwardly projecting arm $m^2$, the free end of which is slotted to slidingly engage the axle $i$. When the cross-head $d$ is given a back-and-forth movement by means of the connecting rod $o$ and crank $p$, the arm $m^2$ of the sector gear $m$ oscillates in a vertical plane and the gear $h^2$ and its shaft $k$ is accordingly rotated and from gear $h^1$ the upper and lower racks $g^1$ and $g^2$ are made to move in opposite directions. The forming blocks $5^a$ and $5^b$ thereupon engage and bend together the two flat shank ends of the chain link, as shown in Fig. 6, its final form being that shown in Fig. 14.

The operation of the machine is as follows:

A previously bent U-shaped link is placed with its curved part in holder $1^c$, its free ends between the die $1^a$ and anvil $1^b$. When crank $p$ is set in motion toward the left in Fig. 1 the die $1^a$ is brought into action with its anvil $1^b$ to forge down and oppositely bevel the two free shank ends of the blank, as shown in Fig. 6. The blank with its beveled ends is then placed in holder 6 on the horizontal rail C of the machine frame, the beveled ends of the blank projecting in the path of travel of both of the forming blanks $5^a$ and $5^b$. These forming blanks are so arranged, as shown in Fig. 8, that when they approach each other in opposite directions, as indicated by the arrows, the two shanks of the link are made to overlap at their ends, as in Fig. 14. The initial position of the shank ends is shown in Fig. 8, and their final position, after the action of forming blocks $5^a$ and $5^b$, is shown in Fig. 9 by dotted lines. The chain link thus formed is then placed on the stationary forming anvil $2^b$.

During the motion of the crank $p$ the die $2^a$ comes down on anvil $2^b$, and the ends of the link are rolled or pressed tightly to each other.

Between the operation of dies $2^a$ and $2^b$, whereby the link is accurately formed, and the operation of the next die $3^a$, $3^b$, it is necessary to heat the link to welding condition. The heated link is then placed on stationary anvil $3^b$, where it is welded by the operation of die $3^a$. The chain link is thereby completed. However, if it is desired to add a cross bar to the link, the die $4^a$, shown in Fig. 1 and its anvil $4^b$ are employed, the link and cross bar first being heated and the link then placed in position on anvil $4^b$, as indicated by the dotted lines in Fig. 1. The cross bars are then welded to each other by the action of the die $4^a$.

Having thus described our invention, what we claim and desire to secure by Letters Patent is:

1. A chain-making machine comprising in combination a frame having guideways and a cross-head slidable thereon, means for reciprocating said cross-head, an axle carried by said cross-head and capable of partial rotation therein, a toothed gear sector fixed on said axle, a stationary toothed rack meshing with said gear sector, a die-carrying segment fixed on said axle, dies fixed to the rim of said segment, and stationary anvils arranged in a row and adapted to be successively engaged by said dies during the normal operation of said die-carrying segment.

2. A chain-making machine comprising in combination a machine base having an oscillating member, adapted also to back-and-forth movement on said base, means for oscillating and reciprocating said member, a series of dies on said member, a series of fixed anvils on said machine base, said dies and anvils adapted to be brought into operative relation as the reciprocation takes place.

3. A machine constructed as set forth in claim 2, having a pair of oppositely movable forming blocks, and block-operating means, actuated by said oscillating member.

4. A chain-making machine comprising in combination, a machine base having an axle movable transversely therein and capable of partial rotation during said transverse movement, means for imparting transverse movement to said axle, an oscillating member fixed to said axle, toothed gear sectors also fixed to said axle, stationary toothed racks meshed with said sectors, a series of dies on said oscillating member, and a series of fixed anvils on said machine base and adapted for co-operation with the dies on said oscillating member.

In testimony whereof, we affix our signatures.

ANTON HELLE.
FRITZ HELLE.